United States Patent [19]

Graf

[11] Patent Number: 4,600,358

[45] Date of Patent: Jul. 15, 1986

[54] MANIPULATING DEVICE OPERATING IN TWO DIRECTIONS

[75] Inventor: Bernhard Graf, Plochingen, Fed. Rep. of Germany

[73] Assignee: Fraunhofer-Gesellschaft z.Förd.der angew. Forschung, Munich, Fed. Rep. of Germany

[21] Appl. No.: 494,775

[22] Filed: May 16, 1983

[30] Foreign Application Priority Data

May 18, 1982 [DE] Fed. Rep. of Germany ....... 3218712

[51] Int. Cl.$^4$ .................. B66C 13/08; B25J 13/00; B23Q 7/04
[52] U.S. Cl. .................................... 414/749; 901/16; 901/25
[58] Field of Search ............... 901/9, 16, 15, 25, 49; 414/749, 750, 751

[56] References Cited

U.S. PATENT DOCUMENTS

| | | | |
|---|---|---|---|
| 4,156,367 | 5/1979 | Pardo et al. | 901/16 X |
| 4,196,049 | 4/1980 | Burns et al. | 901/49 X |
| 4,229,136 | 10/1980 | Panissidi | 901/16 X |
| 4,260,319 | 4/1981 | Motoda et al. | 901/16 X |

FOREIGN PATENT DOCUMENTS 53-36869 4/1978 Japan .................. 901/16 X

Primary Examiner—Terrance L. Siemens
Attorney, Agent, or Firm—Horst M. Kasper

[57] ABSTRACT

A two axes manipulating device is provided for the movement of work pieces between two arbitrary desired points in a plane. The device comprises a carriage with guide tracks for two axes disposed at a 90 degree angle relative to each other. The drive is provided under computer control via gear rack and pinion. A position sensing transducer with a pulse generator is provided in each case for the control of the drive. The invention provides a simple and economic apparatus where the gripper can be rapidly and accurately positioned. The computer control comprises a position and a speed control circuit. The carriage comprises means for balancing weights capable of moving in a vertical direction. The balancing is preferably provided by a rotating air piston engine. An electrically disengageable brake can be provided at the vertical axis. The carriage can be a light weight product, for example made from carbon fiber reinforced plastic.

23 Claims, 6 Drawing Figures

MANIPULATING DEVICE OPERATING IN TWO DIRECTIONS

BACKGROUND OF THE INVENTION

1. Field of the Invention

The present invention relates to a manipulating device operating in two directions for the motion of work pieces between desired positions within a plane and adapted in particular for the loading and unloading of planar magazines.

2. Brief Description of the Background of the Invention Including Prior Art

Manipulating devices are known in various configurations. For example, such a manipulating device is taught in "wt Zeitschrift für industrielle Fertigung 71 (1981) 141-145". This device is movable in the direction of two axes and comprises as a core piece a slide, which is guided on two parallel round rods in horizontal direction in two correspondingly adapted bores of the slide. The round rods are attached at their ends to portal columns of a spacially fixed position frame. A toothed gear rack runs parallel to the round rods, into which a pinion engages at the end of the drive shaft of a drive motor disposed at the slide for providing a horizontal motion of the slide.

In addition, two parallel vertical bores are provided in the slide each of which guiding a vertical round rod. The lower ends of the vertical round rods are united in an end plate, at which a gripper for the work piece is disposed. This unit (round rods, end plate, gripper, and work piece) can be moved up and down relative to the slide by way of a second drive motor cross-attached to the slide and provided with a pinion, which engages a vertically disposed gear rack connected to the end plate. Optical pulse generators are provided at the inner end of the drive motors as position sensing systems for controlling the motions of the gripper within the work area defined by the dimensions of the round rods and of the toothed gear racks. The drive motors are controlled by the pulses from the pulse generators preferably via a computing unit such that the work piece adopts the position predetermined in each case. Electromagnetical brakes are provided at the drive motors in order to avoid overdriving and to secure the work piece once the desired position is reached.

This known device is associated with the following disadvantages:

Inaccuracies in the positioning result from the flanging of the pulse generator of the position measuring system to the drive motor and the ensuing transfer of the backlash of its gear play onto the pulse generator.

The error caused by the play between the pinion and the gear rack is added to the inaccuracies.

The slide is produced by cutting and therefor comprises a considerable mass.

The mass is increased by the braking of the drive units and the required driving power is increased.

The drive motor is loaded by the weight of the parts movable in a vertical direction and this renders exact positioning more difficult.

SUMMARY OF THE INVENTION

It is an object of the present invention to avoid deficiencies associated with conventional manipulating devices.

It is another object of the present invention to provide a manipulating device where the grippers can be moved rapidly and accurately into any desired position within the work range.

It is a further object of the present invention to provide a manipulating device and method adapted to operate as a robot and to increase the efficiency of automatic plant operations.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

Figure 1:
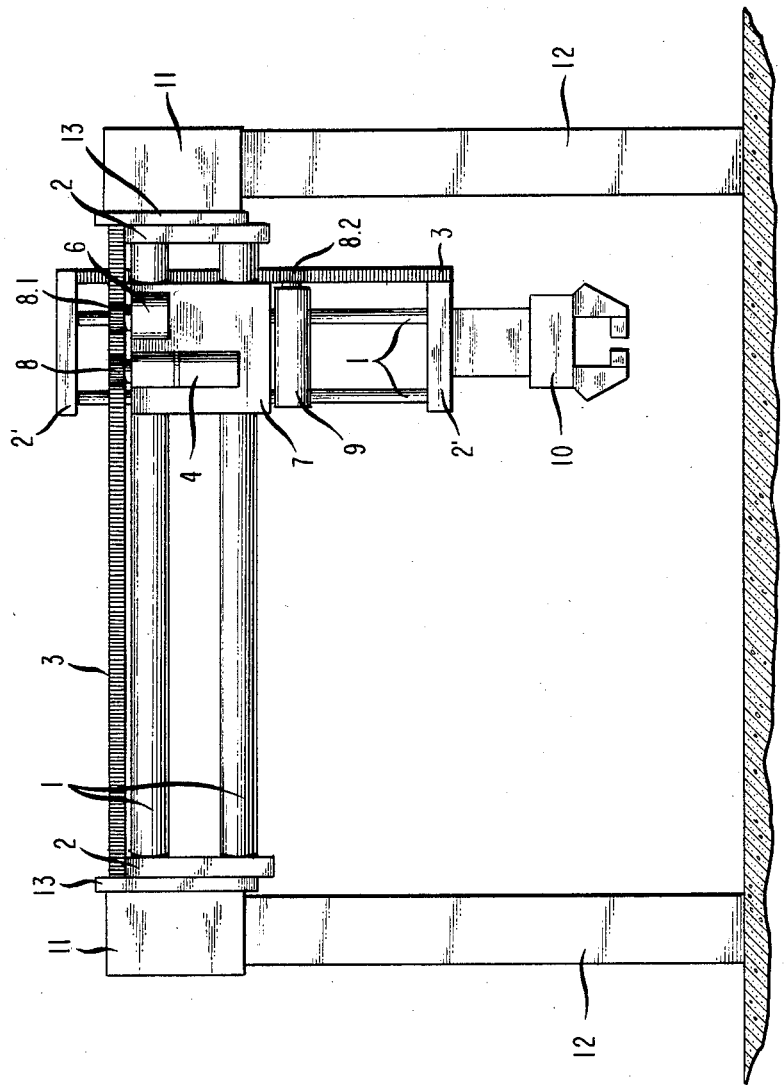
FIG. 1 is a schematic front elevational view of the manipulating device between two portal support columns.

In accordance with the present invention there is provided a two axes handling and manipulating device for moving work pieces between two arbitrary desired points in a plane and in particular for the loading and unloading of planar magazines, which comprises a carriage with guide tracks, in particular guide track bores for two axes coordinated relative to each other at an angle of 90 degrees, which are formed in each case by two parallel round rods adapted to the bores and which carriage is provided with drive units preferably operated by computer control circuits for each axis with in each case a drive motor and a pinion engaging into a gear rack parallel to the axis as well as provided with in each case a position sensing transducer with a pulse generator dependent on the distance covered at each axis, where the one pair of guides is spacially fixed and preferably is horizontally, exchangeably attached between for example two portal columns, while an end plate with a gripper for the work piece is disposed at the free end of the other, preferably vertically, movably disposed guide pair, which is characterized in that the pulse generator 6, 6' is spacially separated from the drive units 4, 4' and disposed at the carriage 7 and in each case a prestressed sensor pinion 8.1, 8.1' engaging the corresponding gear rack 3, 3' is provided, in that the computer control of the drive units comprises a position and speed control circuit, which allows reaching exactly any desired position of the work piece without the use of mechanical brakes and then maintaining such position, and in that a means is provided at the carriage which effects a balancing of the weight of the parts 1', 2', 3', 10 movable in the direction of the vertical axis.

The spacial separation of the pulse generating unit from the drive unit ensures that the pulse generator follows without play and backlash to the motions of the gear rack. The elimination of mechanical brakes eliminates deficiencies caused by the mechanical brakes at the drive units with regard to the accuracy of the positioning and to the load of the motors. The computer control leads the gripper always back into the set position with the aid of the backlash-free pulse generator even in case of possible necessary movements. The means for balancing the weight substantially alleviates the requirements to be set for the control, since the drive unit does not have to pick up for the vertically moving parts the own weight of these parts and does not have to provide the power to move these parts against the weight force.

The means for providing balancing of the weight can be provided as a holding motor 9 with a load pinion 8.2 engaging the gear rack 3', the rest torque of which can be adjusted by adapting the energy fed in such that an oppositely directed force equal to the weight of the parts 1', 2', 3', 10 is exerted onto the gear rack. The load pinion of the holding motor can engage the vertical gear rack and the fed in energy can be adjusted such that the pinion exerts onto the gear rack a counter force equal to the weight of the vertically moving parts.

The holding motor can be a rotating piston air engine 9, the air pressure and air amount of which can be adjusted. This is a particularly advantageous and simple provision for providing the balancing of the mass weight force. The rotating air piston engine, which is for example also used in the driving of drilling machines, comprises a cylindrical case with an input and output for the compressed air required and includes a rotor provided with plates. If the rotor is stopped, for example by way of the pinion engaging the gear rack, then the torque of the motor can be continuously adjusted by setting the pressure and amount of the compressed air such that the force exerted by the pinion on the gear rack is exactly equal to the weight proper of the parts moving in the direction of the vertical axis, without that at the same time the motion proper of the toothed gear rack is impeded.

At the provision set forth above the vertically moving parts of the manipulating device including the work piece are hanging exclusively at the pinions of the drive unit and of the holding motor via the gear rack. In order to avoid a falling down of parts in case of a failure in the input of the energy, it is therefore necessary to provide a brake as follows. An electrically disengageable brake 5 can be provided at the drive unit 4' for the vertical axis, which stops the drive axis immediately in case of failure of the energy feed to the means for providing balancing, for example to the rotating piston air engine 9.

The carriage 7 is a unit built from low specific weight materials and is produced for example from cast aluminum or from a carbon-fiber reinforced plastic. This is advantageous as the mass of the moving parts influences the positioning speed of the the manipulating apparatus and as a manufacturing by cutting requires in general larger wall thicknesses.

The connections for the supply of energy and for the signal lines can be provided as plug connectors. The input of energy and the transmission of signals is provided according to conventional techniques via a movable conduit chain. If the manipulating device is to be changeable by exchange of the guide tracks and of the gear racks in its operating range, then it is advantageous to provide the conduit connections as plug connections.

Referring now to FIG. 1, there is shown a two axes manipulating device supported between two portal columns 12, which are provided at their tops with in each case one movable spanner 11 with a side flange 13. Also a one side attachment of the device at a column or at a wall surface is possible.

The core of the manipulating device is provided by a carriage 7 produced from light metal or plastic without cutting, which is guided by way of bores not shown in FIG. 1 on two round rods 1. The parallel disposed round rods 1 are connected at their ends via end plates 2, which are disengageably attached at the side flanges 13 of the spanners 11. A gear rack 3 runs parallel to the round rods 1 between the end plates 2. The carriage 7 can be moved back and forth on the round rods 1. The drive of the carriage 7 is provided by a drive motor 4, which is preferably a gear motor, which then engages the gear rack by way of a pinion 8. An optical pulse generator 6 is disposed in parallel to the drive motor 4 at the carriage 7, which engages without backlash the gear rack 3 with its own pinion 8.1 and which thus allows to determine the distance covered by the carriage in a horizontal direction.

Two parallel round rods 1' are slidably guided through vertical bores not shown in the carriage 7. The parallel round rods 1' are connected at their lower ends via end plates 2'. A gear rack 3' running parallel to the vertical round rods 1' is attached on the side of this end plate 2'. The end plate 2' is connected at the bottom to the gripper 10 of the manipulating device, which for example can grip a work piece and which can release a work piece again. The gripper 10 is movable in vertical direction versus the carriage 7 via round rods 1' serving as guides. The drive of the gripper in this direction and the measurement of its path is provided by a drive motor and by an optical pulse generator, which are disposed horizontally at the carriage, which however are not visible in FIG. 1. The drive motor and the pulse generator grip, as illustrated above, with a pinion in each case into the vertical gear rack 3'.

A rotating air piston engine 9 is disposed horizontally under the carriage 7, which also engages the vertical gear rack 3' with its pinion 8.2. By properly adjusting of pressure and volume of the air passing through the motor 9 it can be achieved that the force exerted by the pinion 8.2 on the gear rack 3' is as large as the weight of the parts 1', 2', 3', and 10 hanging at the carriage 7 and movable in the direction of the vertical axis, such that these weight forces are not to be counterbalanced by the drive motor.

The control of the manipulating device for positioning of the gripper or, respectively of the work piece gripped by the same into predetermined positions is provided advantageously by a computer control, which processes the signals of the pulse generators 8.1, 8.2 and which comprises a control circuit for the position and speed, which is known in the art. The control circuit allows to reach any desired position without the use of mechanical brakes at the drive motor and to maintain such position. The manipulating device according to the invention comprises in fact an electrically disengageable brake 22 at the drive unit for the vertical gear rack 3'. This brake 22 however serves only to avoid that in case of a failure of the energy input for the rotating air piston engine 9 the vertically movable parts with the gripper do not fall down.

Figure 2:
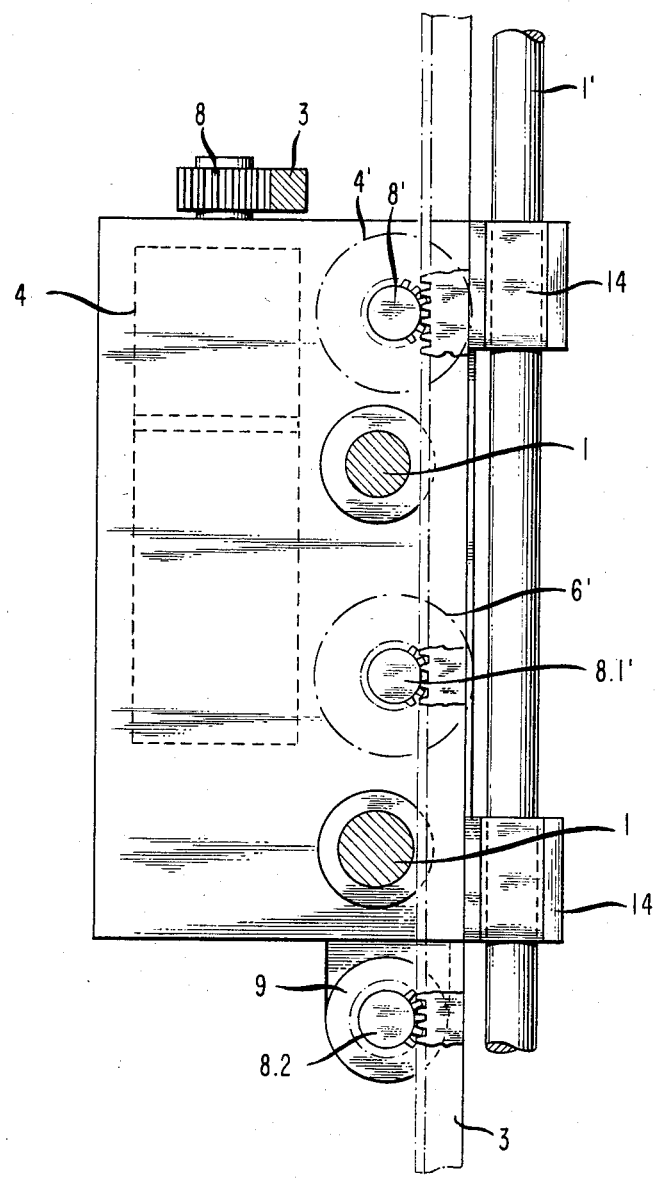
FIG. 2 is a schematic side view of the carriage of the manipulating device at a larger scale.
Figure 3:
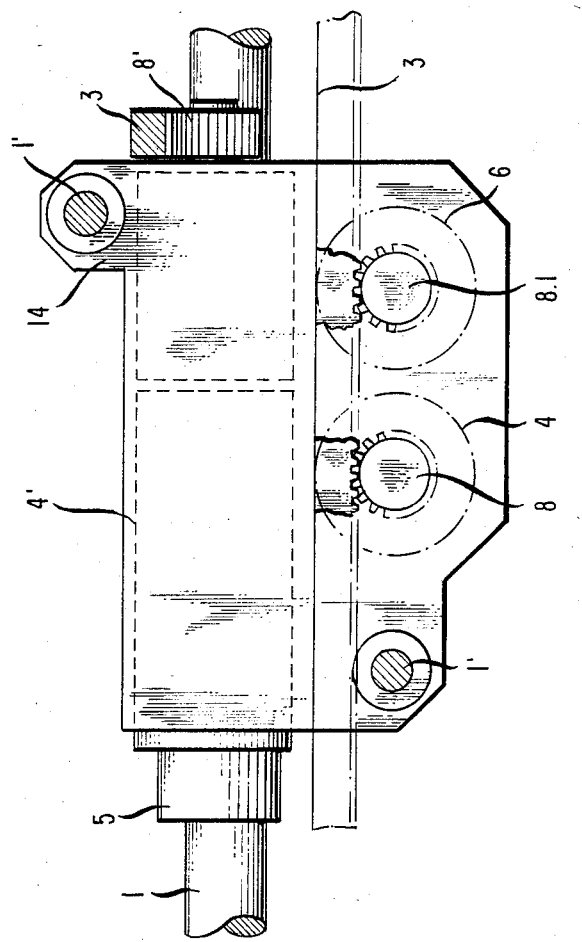
FIG. 3 is a schematic top plan view of the carriage according to FIG. 2.

The side view and the plan view of the carriage 7 in the FIGS. 2 and 3 show on a larger scale some details of the manipulating device according to the invention, which are not or insufficiently clear recognizable in the schematic FIG. 1. The reference numerals for the same parts are the same as in FIG. 1.

On the left in the side view of the carriage 7 according to FIG. 2 there is shown in dashed lines the drive motor 4 with the gearwork joining in upward direction. The drive pinion 8 for the horizontal motions of the carriage and the corresponding gear rack 3 protrude on the top from the carriage case. The horizontal round rods 1 are visible in section at the top and bottom in case bores on the right hand side of FIG. 2. Completely at the right hand side there runs one of the vertical round rods 1', the guide bores of which are disposed in protrusions 14 of the carriage case. The pinions 8' or, respectively, 8.1' of the drive motors 4' or, respectively, of the pulse generator 6' for the vertical distance measurement as well as the rotating air piston engine 9 and its pinion 8.2 are shown engaging the vertical gear rack 3'.

The plan view on the carriage of FIG. 3 shows at the right top a cross-section through the vertical gear rack 3', into which the pinion 8' of the corresponding drive motor 4' engages with intermediately disposed gear. An electrically disengageable brake 5 is disposed at the rear end of the drive motor 4'. One of the case protrusions 14 is disposed above the drive unit 4', 8' and the vertical round rod 1' is guided through the vertical bore of the protrusion 14. The lower part of FIG. 3 shows in addition to the horizontal gear rack 3 the pinions 8 and 8.1 of the drive motor 4 and of the pulse generator 6 engaging the gear rack 3 for providing the horizontal carriage motion. In addition, a case bore for the other vertical round rod 1' of the carriage guide is shown in FIG. 3 on the left hand side, bottom.

Figure 4:
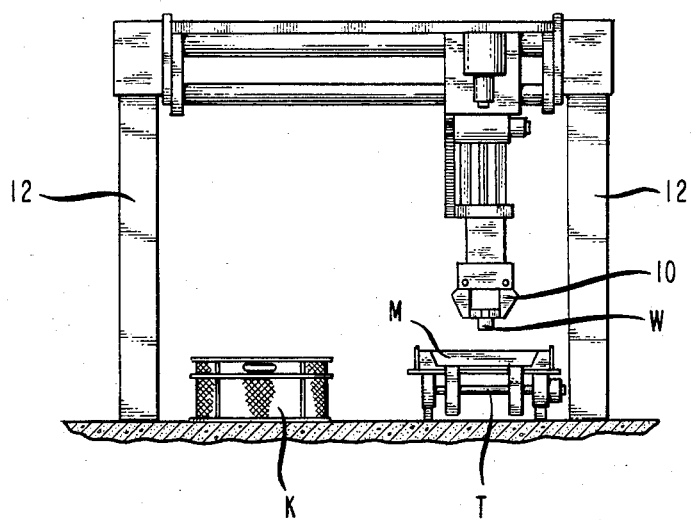
FIG. 4 is a schematic representation showing a possible application of the manipulating device.

In order to illustrate the possibility of application of the manipulating device according to the present invention there is shown in FIG. 4 schematically such a device between two portal columns set on a solid ground in a front elevational view. For example work pieces W can be transported from a magazine M, which is disposed on a conveyor belt T, into a transportation container K. For this manipulation only a very simple manipulating apparatus is required with a possibility of motion in the direction of two axes.

Figure 5:
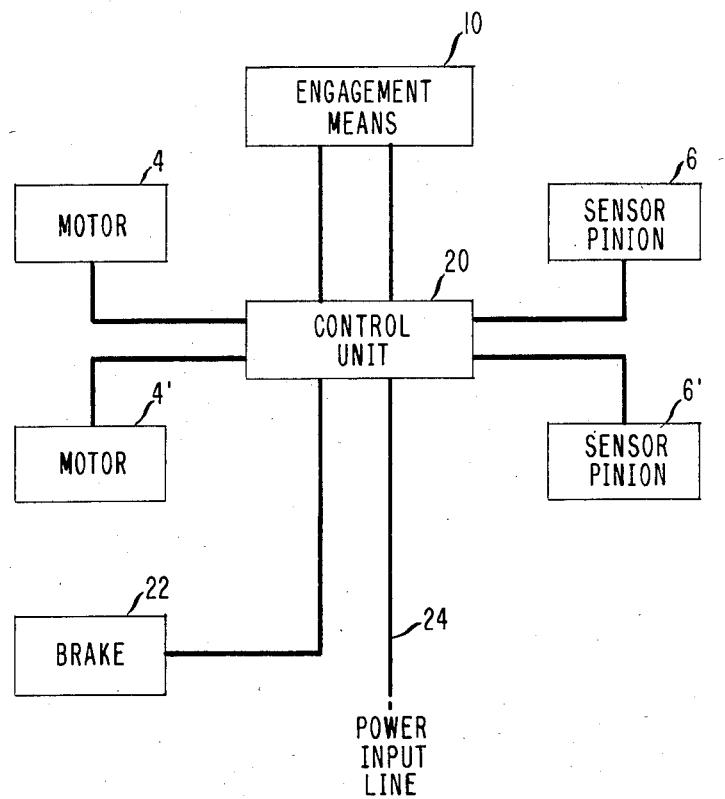
FIG. 5 is a view of a circuit diagram of a manipulating device according to the invention.
Figure 6:
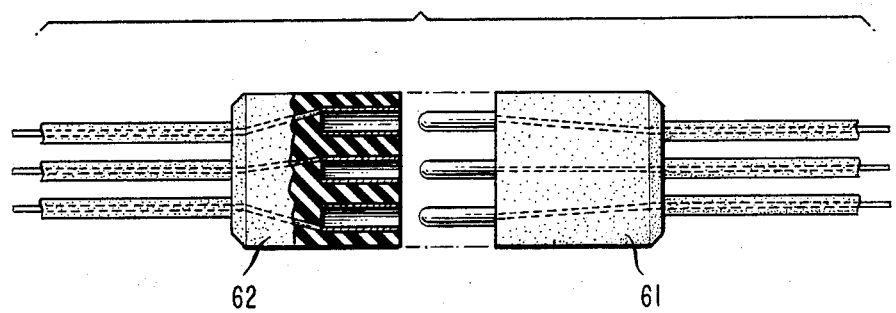
FIG. 6 is a schematic view of a male plug 61 and a female plug 62.

FIG. 5 shows a schematic diagram of the electrical connections and of the control provisions, which can be employed in operating the manipulating device of the present invention. Power input is provided via a line 24. The signals from the sensor pinions 6, 6' are fed to the control unit 20. Depending on the set point entered into the control unit 20 and the measured values from the sensor pinions the drive units 4, 4' are correspondingly energized. The control unit is further connected to an engagement means 10, which is preferably a gripper, to control the interaction of the engagement means with the desired material to be manipulated. In addition, an electrically disengageable brake 5 is connected to the control unit 20, which is released into locking position upon failure of the energy supply such that vertically moveable parts and attached materials cannot suddenly fall down in case the balancing means cannot any longer balance the weights moving in a vertical direction.

It will be understood that each of the elements described above, or two or more together, may also find a useful application in other types of robot system configurations and in manipulating procedures differing from the types described above.

While the invention has been illustrated as embodied in the context of a manipulator operating in a plane, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Two directional manipulating device for the moving of work pieces between desired positions
   within a plane comprising support means;
   a first support bar mounted to the support means;
   a first gear rack mounted to the support means and running about parallel to the first support bar;
   a carriage disposed on the first support bar by having a guide track surrounding the first support bar over a certain length;
   a first drive unit attached to the carriage and comprising
     a first drive motor, and
     a first pinion attached to the first drive motor and having its axis parallel to the axis of the first drive motor and engaging the first gear rack;
   a sensor pinion engaging the same rack;
   a first rotary pulse generator mounted on the carriage and the sensor pinion axis being parallel to the axis of the first rotary pulse generator, where the first rotary pulse generator is spacially separated from the first drive unit and comprising a prestressed first sensor pinion engaging the first gear rack;
   a second support bar guided at the carriage by a guide track in the carriage surrounding the second support bar over a certain length;
   an end plate attached to the end of the second support bar;
   a second gear rack mounted to the end plate and running about parallel to the first support bar;
   a second drive unit attached to the carriage and comprising
     a second drive motor, and
     a second pinion attached to the second drive motor and
     engaging the second gear rack;
   a second pulse generator mounted on the carriage spacially separated from the second drive unit and comprising a prestressed second sensor pinion engaging the second gear rack; and
   engagement means attached to the end plate for engaging the work piece.

2. The two directional manipulating device according to claim 1 further comprising
   an electronic control unit for the first and second drive unit including a position control and a speed control circuit for obtaining and/or maintaining a desired position of the engagement means without use of mechanical brakes.

3. The two directional manipulating device according to claim 2 wherein the electronic control unit comprises an analog control section.

4. The two directional manipulating device according to claim 2 wherein the electronic control unit comprises a digital control section.

5. The two directional manipulating device according to claim 1 wherein the first support bar and the second support bar are disposed at about a right angle.

6. The two directional manipulating device according to claim 5 wherein the first support bar is disposed about horizontally and further comprising means mounted on the carriage for balancing the weight of the second support bar and its attachments movable in a vertical direction.

7. The two directional manipulating device according to claim 6 wherein the means mounted on the carriage comprises a holding motor, and a load pinion attached to the holding motor engaging the second gear rack, where the torque of the motor in rest position is adjustable by adapting the energy fed in such that a force is exerted on the second gear rack which amounts to the weight of the second support bar and its attachments and which force is oppositely directed to the direction of the weight force of the second support bar.

8. The two directional manipulating device according to claim 7 wherein the holding motor is a rotating piston air engine where the amount and pressure of the air fed in can be adjusted.

9. The two directional manipulating device according to claim 6 further comprising an electrically disengageable brake disposed at the second drive unit for stopping the second pinion immediately upon failure of the energy feed to the means mounted on the carriage.

10. The two directional manipulating device according to claim 5 wherein the first support bar is disposed vertically and further comprising means mounted on the carriage for balancing the weight of the carriage and its attachments movable in a vertical direction.

11. The two directional manipulating device according to claim 1 wherein the carriage is produced from materials of a high strength to weight ratio.

12. The two directional manipulating device according to claim 11 wherein the carriage is produced from cast metal containing aluminum.

13. The two directional manipulating device according to claim 11 wherein the carriage is of a metal containing titanium.

14. The two directional manipulating device according to claim 11 wherein the carriage is of a metal containing magnesium.

15. The two directional manipulating device according to claim 11 wherein the carriage is made of a material containing fiber reinforced plastic.

16. The two directional manipulating device according to claim 1 wherein connectors for energy to be fed to the manipulating device and for signal lines are provided as plug connectors.

17. The two directional manipulating device according to claim 1 wherein the engagement means for engaging the work piece is a gripper.

18. The two directional manipulating device according to claim 1 wherein the manipulating device is adapted to the loading and unloading of horizontal magazines.

19. The two directional manipulating device according to claim 1 wherein the first support bar and the second support bar are each provided by two round rods adapted to corresponding guide track bores in the carriage.

20. The two directional manipulating device according to claim 1 wherein the first support bar is exchangeably mounted on the support means.

21. A method for manipulating in two directions by engaging a workpiece with an engaging means comprising an apparatus having support means;

a first pair of round rods and a first gear rack detachably attached to the support means;

a carriage having guide track bores adapted to the first pair of round rods placed onto the first pair of round rods; a first pinion attached to a first drive motor of the first drive unit where the pinion has its axis parallel to the axis of the first drive motor;

said first gear rack engaging with the first pinion and with a sensor pinion;

a first rotary pulse generator mounted on the carriage with the sensor pinion axis being parallel to the axis of the first rotary pulse generator, where the first rotary pulse generator is spacially separated from the first drive unit mounted on the carriage;

a second pair of round rods slidably disposed into corresponding guide track bores in the carriage at an angle of about 90 degrees relative to the first pair of round rods;

an end plate attached to the end of the round rods;

an engagement means and a second gear rack running parallel to the second pair of round rods mounted onto the end plate;

where the second gear rack is engaged with a second drive unit and a pulse generator spacially separated from the second drive unit; and controlling the position of the engagement means by a control unit fed from the first and second sensor means and energizing the first and second drive unit to provide control of position and of the motion of the engagement means.

22. The method for manipulating in two directions according to claim 20 wherein the first and second sensor means are provided by prestressed sensor pinions engaging the second gear rack.

23. The method for manipulating in two directions according to claim 20 further comprising balancing the weight of the second pair of support rods and of their attachments by a means disposed on the carriage.

* * * * *